(12) United States Patent
Heintzmann et al.

(10) Patent No.: US 6,267,211 B1
(45) Date of Patent: Jul. 31, 2001

(54) DRIVE UNIT FOR MACHINERY, ESPECIALLY MINING MACHINERY

(75) Inventors: Peter Heintzmann, Bochum; Kuno Guse, Witten; Friedel Amling; Peter Kröninger, both of Gelsenkirchen; Bernd Hölling, Bochum, all of (DE)

(73) Assignee: Bochumer Eisenhutte Heintzmann GmbH & Co. KG, Bochum (DE)

( * ) Notice: Subject to any disclaimer, the term of this patent is extended or adjusted under 35 U.S.C. 154(b) by 0 days.

(21) Appl. No.: 09/274,492

(22) Filed: Mar. 23, 1999

(30) Foreign Application Priority Data

Apr. 7, 1998 (DE) .................................. 19815445

(51) Int. Cl.⁷ .......................... F16D 67/02; F16D 33/00
(52) U.S. Cl. ........................................ 192/3.23; 192/12 R
(58) Field of Search ............................ 192/3.23, 3.24, 192/57, 12 R, 58.3

(56) References Cited

U.S. PATENT DOCUMENTS 2,093,498 * 9/1937 Walti ............................... 192/3.24 X
4,805,473 * 2/1989 Bower .................................. 74/361

FOREIGN PATENT DOCUMENTS

| 33 18 462 A1 | 11/1984 | (DE) . |
| 33 23 251 C2 | 6/1985 | (DE) . |
| 37 42 342 A1 | 6/1989 | (DE) . |
| 40 20 303 A1 | 8/1991 | (DE) . |
| 43 40 251 C2 | 6/1994 | (DE) . |
| 42 16 798 A1 | 12/1994 | (DE) . |
| 0 166 511 A1 | 6/1986 | (EP) . |

* cited by examiner

Primary Examiner—Rodney H. Bonck
(74) Attorney, Agent, or Firm—Herbert Dubno

(57) ABSTRACT

A drive unit for a mining machine such as a mining plow or conveyor drives a sprocket wheel of the chain thereof by an electric motor through a drive train having a turbocoupling and a transmission driven by the motor. A free-shifting clutch is provided in the case of overload to disconnect the load from the motor, the clutch reengaging upon standstill of the two clutch halves. Alternatively the turbine output of the fluid coupling is branched and is applied through one friction clutch directly to the input shaft of the transmission or through a second friction clutch to a parallel shaft connected by gearing to the transmission input shaft.

9 Claims, 3 Drawing Sheets

DRIVE UNIT FOR MACHINERY, ESPECIALLY MINING MACHINERY

FIELD OF THE INVENTION

Our present invention relates to a drive unit for machinery, especially mining machinery, such as mining excavators and conveyor apparatus, wherein a drive motor, a turbocoupling, fluid coupling, hydrodynamic coupling, hydraulic coupling, and a transmission are connected in a drive train to operate the machine. The term "turbocoupling" is here used to describe a fluid coupling, hydrodynamic coupling or hydraulic coupling, also known as a Voith coupling, of the type having an impeller rotor and a driven rotor and wherein the coupling factor between the impeller or driving member and the driven member is controlled at least in part by the hydraulic filling of the fluid coupling. Usually the machinery is an excavator, for example a plow and/or conveyor and the driven element of that machine is a sprocket wheel to which the machine chain is operatively connected.

BACKGROUND OF THE INVENTION

Drive units having a drive train as described, utilizing a turbocoupling, initially should permit the generation of a high speed by the drive motor, for example an electric motor, with the turbocoupling empty. Upon attainment of the nominal speed of the drive motor, the turbocoupling is filled with its liquid medium, for example oil or water, and enables smooth startup and startup under load of the machine.

The control of the degree of filling of the turbocoupling, as has been noted above, affects the delivered torque and thus the operating state of the drive train. However, a hard blockage of the driven part of the system, i.e. the transmission of the driven element which receives the torque from the turbocoupling can cause on the one hand a delay in fuel-torque transmission between the turbine wheel and the pump wheel, i.e. the driven rotor and the impeller rotor of the fluid coupling to compensate for the blockage and, on the other hand, significant dynamic effects on the fly wheel mass forming the turbine rotor which can be detrimental. As a consequence the overload on the turbocoupling must be removed as quickly as possible in the event of such a hard blockage and in practice, load removal by emptying of the fluid coupling can only be done with a certain time delay. This, of course, can be detrimental to the mining machine or conveyor. For example, the chain may break and, in that case, it is important that the drive motor be decoupled rapidly from the transmission so that the run-out of the chain ends does not occur, thereby delaying repair. Furthermore, upon generation of an emergency signal, the mining machine or conveyor must be shut down immediately and that is not possible with conventional designs of the drive unit for such machines.

OBJECTS OF THE INVENTION

It is, therefore, an important object of the present invention to provide a drive unit for the aforedescribed purposes in which, upon hard blockage at the driven side of the drive train, an instantaneous or substantially instantaneous disconnection of the fluid coupling from the transmission and thus of the drive motor from the load can be effected in a reliable, automatic and rapid manner.

Another object of this invention is to provide a drive unit having an electric drive motor, a fluid coupling and a transmission connected in a drive train, for mining machinery such as a mining excavator and/or conveyor, whereby damage to the system in the event of the development of a hard blockage can be avoided and reliable decoupling of the motor from the remainder of the loaded part of the drive train is ensured.

Still another object of the invention is to provide a drive unit for mining machinery and conveyors utilized in mining applications in which drawbacks of earlier systems are avoided.

SUMMARY OF THE INVENTION

These objects and others which will become apparent hereinafter are attained, in accordance with the invention, in one embodiment thereof by providing between the turbocoupling and the transmission, a free-shifting clutch. Such a free-shifting clutch functions like an overload clutch and in the case of an overload, provides overload protection in the form of a decoupling of the load from the turbocoupling. Since such a clutch can only engage at standstill, i.e. allow the two clutch halves to couple together again at standstill, according to the present invention, each of the clutch halves has a respective brake disk and a cam disk, the brake disk being engaged between brake jaws acted upon by pneumatic brake cylinders while the cam disks are juxtaposed with electronic speed-monitoring devices or sensors so that the speed-monitoring system and the pneumatic brake wheels are connected by a control and evaluating system, e.g. a microprocessor based electronic controller. In this manner, the operating state of the free-shifting clutch can be continuously monitored.

In the coupled state, the pneumatic brake cylinders are vented and the brake jaws are freed from engagement with the brake disk, while in the decoupled state of the free-shifting clutch, as a consequence of overloading, the brake jaws are actuated by the pneumatic brake cylinders and bring about the standstill of the clutch halves so that the free-shifting clutch can once more engage and serve for the smooth start-up for start-up under load. This presumes a complete filling of the previously completely or partially empty turbocoupling while the drive motor can continue to operate. The free-shifting clutch enables adjustment of the overload and as a result, a selected or targeted load shedding for predetermined operating phases. The speed interrogation of the free-shifting clutch or its clutch halves by means of the speed-monitoring devices or sensors can be provided redundantly.

According to a feature of the invention, between the turbocoupling and the free-shifting clutch, a friction clutch, for example a multiplate clutch can be provided. The friction clutch can be connected with one half to the drive side of the turbocoupling and on the other hand to the driven side of the turbocoupling. The friction clutch enables the transmission of torque from the motor through the turbocoupling without using the hydrodynamic effect thereof to the free-shifting clutch, thereby eliminating slip or lag in torque transmission through the turbocoupling. The friction clutch thus allows the turbocoupling to act as a rigid slip-free connection along the drive track, and it is important that the operation is to utilize, rather than the drive characteristic of the turbocoupling, a drive characteristic of the drive motor so that after reaching operating speed, a multipower drive can be provided in which the slip of the turbocoupling can correspond to an order of magnitude of 4 to 5%. The friction clutch is thus capable of short-circuiting the turbine characteristic so that only the motor characteristic prevails. Alternatively, when that friction clutch is disengaged, the turbocoupling characteristic can prevail. The short-circuiting can be effective especially for the heaviest loaded startup. For such heaviest load startup, the friction clutch is opened, the free shifting clutch is closed and the turbocoupling emptied while the drive motor is operated at its nominal speed. The turbocoupling is then filled.

It will be understood that after complete filling of the turbocoupling, the chain of the mining machine or conveyor may not begin to run although the fuel transmittable torque has been applied by the turbocoupling through the transmission to the sprocket wheel. This case is detected by the sensors at the respective shaft segments. Via a controller, closure of the friction clutch, i.e. the sultiplate clutch, can be effected and in this manner the motor or drive shaft can be rigidly connected with the sprocket wheel shaft in a jerky action so that the fuel torque of the drive motor can be applied to the chain. The chain breaks loose and moves. Following this startup under load, the friction clutch remains closed only until the motor current lies below its nominal current. Upon opening of the friction clutch, load compensation by the turbocoupling commences.

In the system of the invention in which the impeller rotor forms a housing surrounding the turbine rotor of the turbocoupling, the friction clutch can have one clutch half formed on a narrowed portion of this housing and the other clutch half affixed to the driven shaft.

Of course, if there is a blockage such that the chain cannot be jogged into motion by the operation of the friction clutch, the free-shifting clutch can open to decouple the sprocket wheel and the transmission from the turbocoupling, the open state of the free-shifting clutch being maintained until the two halves thereof are braked to standstill.

In another embodiment of the invention, the drive shaft of the impeller rotor extends through the turbine rotor and is connected to the driven shaft running to the transmission by a first friction clutch, for example, a multiplate clutch. The turbine rotor is provided with a branching gearing which drives a gear to which one half of a second friction clutch, for example a multiplate clutch, is affixed, the other half of this second friction clutch being connected to an auxiliary shaft in parallel to the output shaft and connected thereto by a gear meshing with a pinion on the output shaft.

The branching or bypass allows the turbine rotor to be connected directly to the input shaft by the second clutch while the first clutch permits the impeller to be connected directly to the input shaft of the transmission. The resulting unit is an especially compact apparatus which enables a hollow shaft-like extension of the turbine rotor to be used with an intermediate shaft to prevent overloading and to achieve results which are similar to those achieved with the free-shifting clutch. The clutches and their respective halves or input and output sides can be monitored by respective speed sensors.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
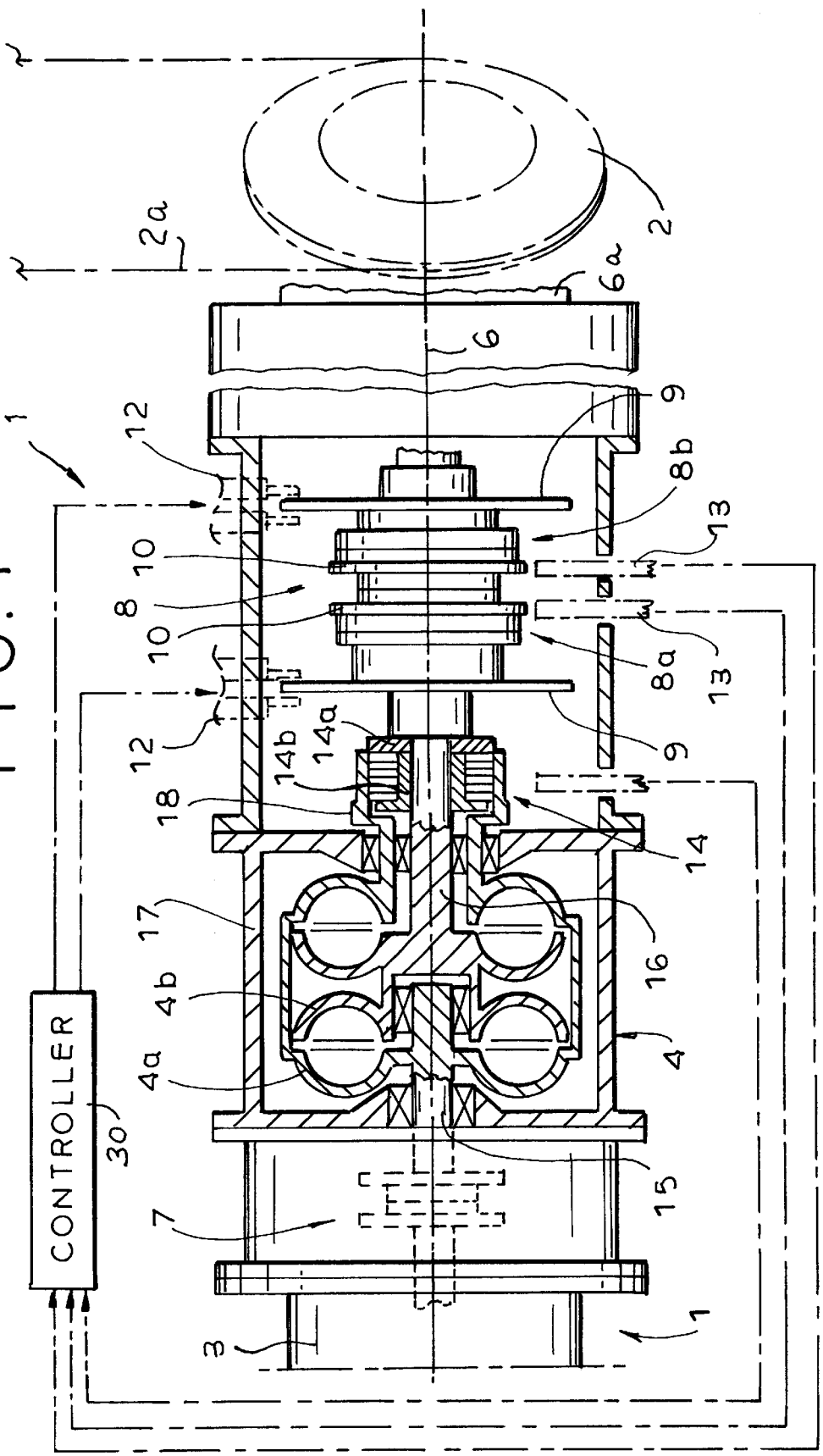
FIG. 1 is a diagrammatic axial section, partly broken away, of a drive unit in accordance with one embodiment of the invention.
Figure 2:
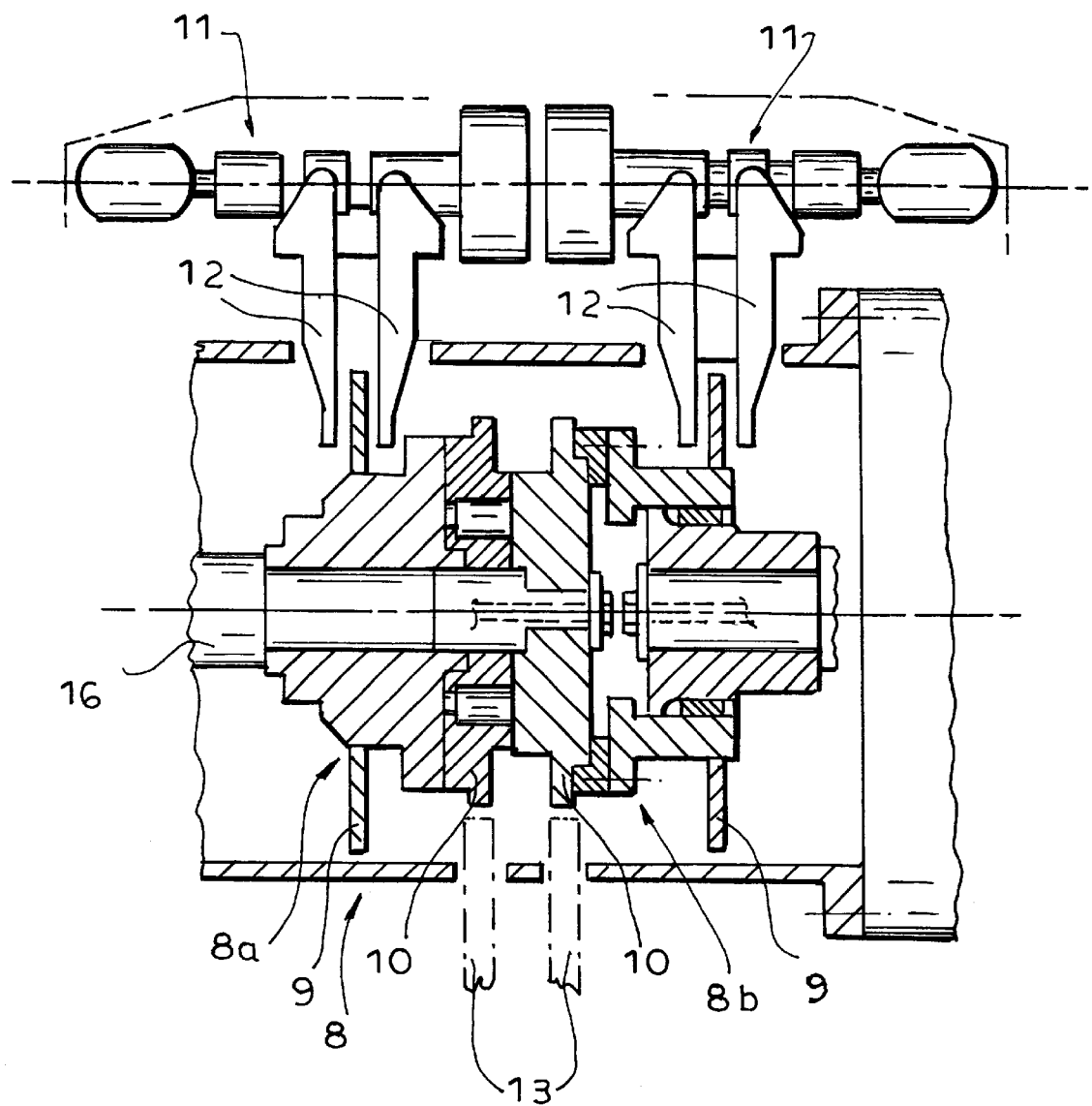
FIG. 2 is a detail of the free-shifting clutch of the embodiment of FIG. 1.

In FIGS. 1 and 2 of the drawing, we have shown a drive unit 1 for a machine for mining or conveying material in a mine, especially a chain-driven coal plow or conveyor in which the chain has been represented at 2a and the sprocket wheel of the chain has been represented at 2. The sprocket wheel is connected to a transmission 5, i.e. speed-reducing gearing, via the output shaft 6a thereof.

This drive unit comprises a drive motor 3, namely an electric motor, a turbocoupling 4 and a transmission 5 forming a drive train 6 operating the shaft 6a.

Between the drive motor 3 and the turbocoupling 4, a further conventional clutch 7 can be provided, e.g. in the form of a jaw clutch or a friction clutch. According to one aspect of the invention, between the turbocoupling 4 and the transmission 5, a free-shifting clutch 8 is provided. The two clutch halves 8a and 8b of the free-shifting clutch 8 each have a brake disk 9 and a can disk 10. A pair of brake jaws 12 cooperate with each brake disk 9 and can be operated by a pneumatic brake cylinder represented diagrammatically at 11.

The can disks 10 are provided with electronic speed-monitoring devices or sensors 13 which, like the pneumatic brake cylinders 11, cooperate with a controller 30 which also forms an evaluating device and may be a microprocessor-based computer.

Between the turbocoupling 4 and the free-shifting clutch 8 there is provided a friction clutch 14 which, in the embodiment illustrated, is a multiplate clutch. The sultiplate clutch 14 connects the drive side 4a of the turbocoupling with the driven side 4b of this turbocoupling and hence is connected to short-circuit turbocoupling 4 when the friction clutch is engaged.

The turbocoupling 4 has, as is conventional, an impeller rotor 4a with a drive shaft 15 and at the output side, a turbine rotor 4b with a driven shaft 16. The impeller rotor 4a has a housing 17 which surrounds the turbine rotor 4b and is formed in the region of the output shaft 16 with a narrowed housing portion 18. The clutch 14 is located in the narrowed housing portion 18 and has one clutch half 14a connected to this housing portion while another clutch half 14b is mounted on and secured to the driven shaft 16.

With the turbocoupling either fully or partly empty, or completely filled with the liquid medium, the friction clutch 14 bridges the input and output sides of this turbocoupling to short circuit its characteristic and cause the motor 3 to drive the transmission 5 without slip directly or as has already been indicated, via the free-shifting clutch 8 so that a multipower transfer in the order of magnitude of that delivered by the turbocoupling at its maximum coupling effect, can be achieved and heaviest load start-up ensured. The free shifting clutch 8 fulfills the function of an overload clutch and in the case of a hard block at the machine automatically opens to decouple the machine from the motor 3.

Figure 3:
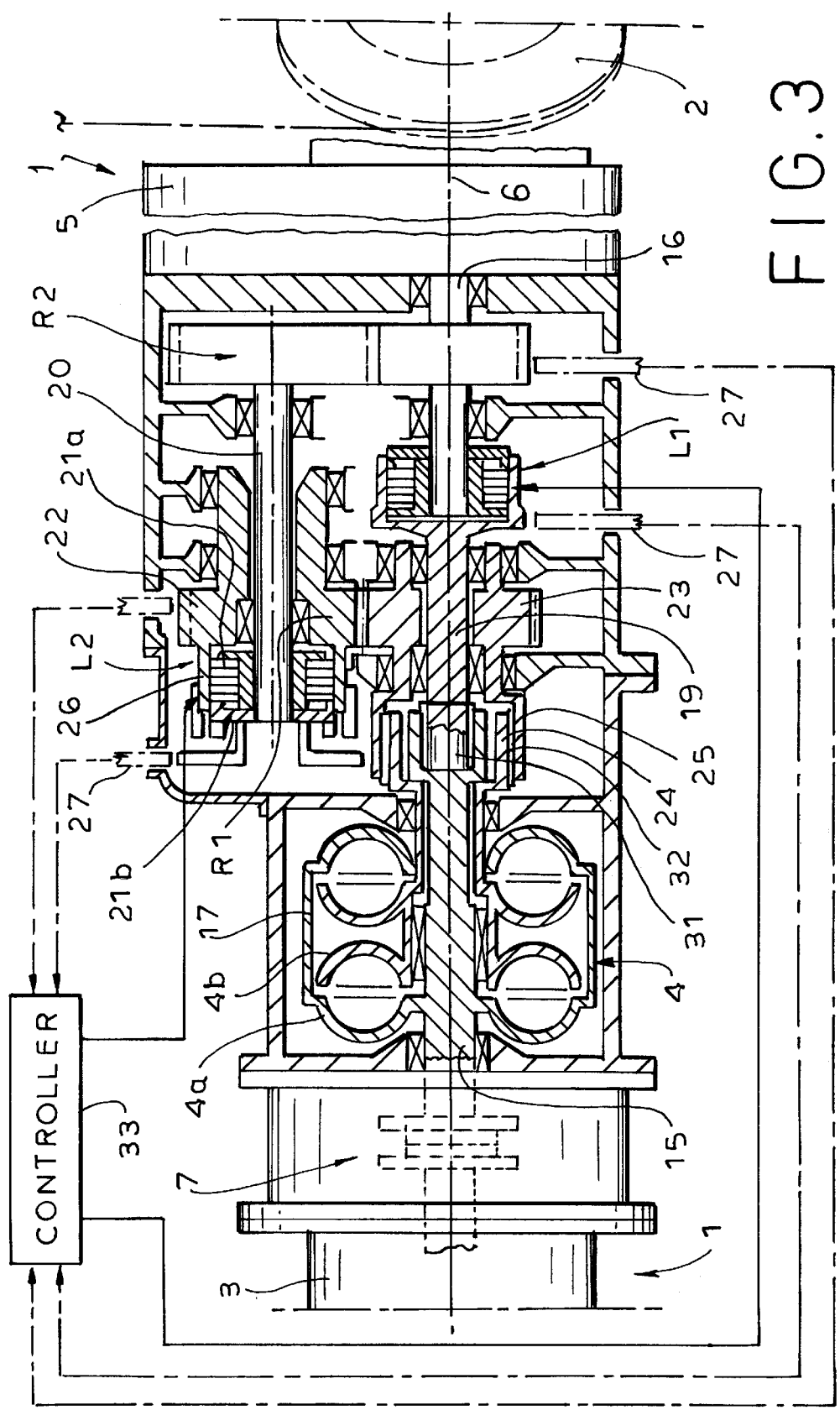
FIG. 3 is a view similar to FIG. 1 of another embodiment of a drive unit for mining machinery.

The embodiment in FIG. 3 has a drive shaft 15 for the impeller rotor of the turbocoupling 4 extending through the turbine rotor 4b thereof and connected via an intermediate shaft 19 with a first friction clutch, namely the multiplate clutch L1, to the driven shaft 16 which provides the input to the gear transmission 5. The connection between the intermediate shaft 19 and the shaft 15 may be a spline connection 31.

The turbine rotor 4b is branched via a hollow shaft-like formation of a gear 23 to a gear 22 forming a housing 26 of a second friction clutch L2, e.g. a multiplate clutch, whose other half is connected to an intermediate shaft 10 in parallel to the shafts 19 and 16. The shaft 20 is connected by a gear set R2 with the shaft 16 and the gear set R1, of course, splits the output from the turbine rotor 4b to the parallel shaft 20 and the clutch L2. The coupling half 21a of the second clutch L2 is affixed to the parallel shaft 20 while the clutch half 21b is connected to the pinion 22. The turbine rotor 4b and the associated pinion 23 have hollow shaft-like extensions 24, 25 which surround the drive shaft 15 and the intermediate shaft 19 and the extension 25 can be coupled by splines with the turbine rotor 4b as shown at 32.

Likewise, the second clutch has a hollow shaft-like formation 26 on the pinion 22. The friction clutches or other clutch halves are provided with speed-monitoring devices or sensors 27 providing inputs to the electronic evaluating circuitry and controller 33 which can automatically operate the clutches L1 and L2 as shown.

This embodiment operates as follows:

1. Load-free speed build up.

Multiplate clutch L2 is closed.

Multiplate clutch L1 is open.

Turbocoupling 4 is empty.

The drive motor 3 is energized and runs without load until it reaches its nominal speed. Upon reaching the nominal speed of the motor, the turbocoupling is filled with its liquid medium and torque transmission is effected over the gear set R1, the multiplate clutch l2 and the gear set R2 of the driven shaft 16. Because of the switchover at high speed of the motor 3, the driven shaft 16 has approximately the same speed as the drive shaft 15 at the motor side.

2. Load-free short-circuiting (switchover of the turbocoupling characteristic to the short-circuit characteristic).

Multiplate clutch L2 is closed.

Multiplate clutch L1 is open.

Turbocoupling 4 is filled.

Drive motor 3 operates close to nominal speed.

The speeds of the drive shaft 15 and the driven shaft 16 are compared. If the speed difference is less than the maximum permissible speed difference, multiplate clutch L1 is iclosed and multiplate clutch L2 is then opened. The drive motor 3 operates practically directly into the drive 5. The turbocoupling 4 is then bypassed mechanically and can be emptied.

3. Hard blockage on the turbocoupling characteristic.

Multiplate clutch L2 is closed.

Multiplate clutch L1 is open.

Turbocoupling 4 is filled.

The drive motor 3 runs at operating speed. The speeds of the two clutch halves of the multiplate clutch L2 are continuously monitored by respective sensors. Upon an overload, the multiplate clutch L2 slips and a speed difference arises across this clutch and the clutch L2 is opened. The drive motor 3 is decoupled from the load.

4. Blocking during short-circuit operation.

Multiplate clutch L2 is open.

Multiplate clutch L1 is closed.

Turbocoupling 4 is full, empty or partially empty.

Drive motor 3 runs at operating speed. The speeds of the two clutch halves of the multiplate clutch L1 are continuously compared. In the case of overload the multiplate clutch L1 slips and a speed difference is ascertained. The multiplate clutch L1 is opened and the drive motor 3 is decoupled from the load.

5. Blocking during high speed of the drive motor.

Multiplate clutch L2 is closed.

Multiplate clutch L1 is open.

Turbocoupling 4 is filled.

The drive motor 3 runs at operating speed. The speeds of the two clutch halves of the multiplate clutch L2 are continuously compared by sensors. Upon overload the multiplate clutch L2 slips and a speed difference is detected. The multiplate clutch L2 is opened and the drive motor decoupled from the load.

We claim:

1. A drive unit for a machine comprising:

a drive motor;

a turbocoupling operatively connected with said drive motor;

a transmission operatively connected to said turbocoupling, said transmission forming with said turbocoupling and said drive shaft motor, a drive train for a machine; and a free-shifting clutch along said drive train between said turbocoupling and said transmission and having clutch halves mutually engaging on standstill and functioning to decouple said transmission from said turbocoupling upon blockage of a machine to prevent overloading a friction clutch being provided between said turbocoupling and said free-shifting clutch along said string, said friction clutch connecting a driven side of said turbocoupling with an output side thereof, said turbocoupling comprising an impeller rotor connected with said motor, and a turbine rotor connected with said free-shifting clutch, said impeller rotor having a housing surrounding said turbine rotor and formed with a narrow housing portion connected to one side of said friction clutch, another side of said friction clutch being connected to a shaft between said turbine rotor and said free-shifting clutch.

2. The drive unit defined in claim 1 wherein each of said clutch halves is formed with a brake disk and a cam disk, each of said brake disks being received between a pair of brake jaws actuatable by a respective pneumatic brake cylinder, said unit further comprising respective sensors for monitoring rotary speeds of said brake halves and control means responsive to said speeds for actuating said pneumatic brake cylinders.

3. The drive unit defined in claim 2 wherein said machine is a mining machine operated by a chain and said transmission is connected to a sprocket wheel for said chain.

4. A drive unit for a machine comprising:

a drive motor;

a turbocoupling operatively connected with said drive motor;

a transmission operatively connected with said turbocoupling, said transmission forming with said turbocoupling and said drive shaft motor, a drive train for a machine;

a first friction clutch between an impeller rotor of said turbocoupling and a shaft connected to said transmission;

a parallel shaft spaced from said shaft connected to said transmission and connected by a set of gears therewith; and a second friction clutch between a turbine rotor of said turbocoupling and said parallel shaft, said impeller rotor being provided with a drive shaft aligned with said shaft connected with said transmission and extending through said turbine rotor.

5. The drive unit defined in claim 4, further comprising an intermediate shaft between said drive shaft and said shaft connected to said transmission, said intermediate shaft being provided with one clutch half of said first friction clutch and said shaft connected to said transmission being provided with a second clutch half of said first friction clutch.

6. The drive unit defined in claim 5, further comprising a second set of gears including a pinion gear on said intermediate shaft connected to said turbine rotor and meshing with another pinion surrounding said parallel shaft, a first clutch half of said second friction clutch being connected to said other pinion and a second clutch half of said second friction clutch being connected to said parallel shaft.

7. The drive unit defined in claim 6 wherein said pinion gear on said intermediate shaft has a hollow shaft extension coupled with a hollow shaft extension on said turbine rotor.

8. The drive unit defined in claim 7, further comprising respective sensors monitoring rotary speeds of the clutch halves of each of said clutches.

9. The drive unit defined in claim 8 wherein the machine driven by the drive train is a mining machine driven by a chain and said transmission is connected to a sprocket engaging said chain.

* * * * *